United States Patent
Mangal et al.

(10) Patent No.: US 7,436,779 B1
(45) Date of Patent: Oct. 14, 2008

(54) METHOD AND SYSTEM FOR CONTROLLING WHEN A RADIO LINK LAYER CONNECTION TO A WIRELESS TERMINAL IS RELEASED

(75) Inventors: Manish Mangal, Overland Park, KS (US); Mark Yarkosky, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 959 days.

(21) Appl. No.: 10/441,359

(22) Filed: May 20, 2003

(51) Int. Cl.
*H04L 12/26* (2006.01)
(52) U.S. Cl. .................. 370/252; 370/349; 370/401
(58) Field of Classification Search .................. 370/349, 370/338, 347, 252, 253, 401; 455/574
See application file for complete search history.

(56) References Cited

U.S. PATENT DOCUMENTS

| | | | |
|---|---|---|---|
| 4,870,408 A | 9/1989 | Zdunek et al. | |
| 5,442,809 A | 8/1995 | Diaz et al. | |
| 5,568,511 A | 10/1996 | Lampe | |
| 5,710,591 A | 1/1998 | Bruno et al. | |
| 5,818,836 A | 10/1998 | DuVal | |
| 5,850,611 A | 12/1998 | Krebs | |
| 5,884,196 A | 3/1999 | Lekven et al. | |
| 5,936,964 A | 8/1999 | Valko et al. | |
| 5,983,099 A | 11/1999 | Yao et al. | |
| 6,014,556 A | 1/2000 | Bhatia et al. | |
| 6,032,051 A | 2/2000 | Hall et al. | |
| 6,041,241 A | 3/2000 | Willey | |
| 6,119,017 A | 9/2000 | Cassidy et al. | |
| 6,178,323 B1 | 1/2001 | Nagata | |
| 6,381,467 B1 | 4/2002 | Hill et al. | |
| 6,442,652 B1 * | 8/2002 | Laboy et al. | ................. 711/138 |
| 6,490,452 B1 | 12/2002 | Boscovic et al. | |
| 6,526,377 B1 | 2/2003 | Bubb | |
| 6,529,497 B1 * | 3/2003 | Hjelm et al. | ................. 370/347 |

(Continued)

FOREIGN PATENT DOCUMENTS

| | | |
|---|---|---|
| EP | 0 817 457 | 1/1998 |
| EP | 0 984 608 | 3/2000 |

OTHER PUBLICATIONS

International Search Report from International Application No. PCT/US2003/02950, dated Jan. 30, 2003.

(Continued)

*Primary Examiner*—Ricky Ngo
*Assistant Examiner*—Gary Mui (57) ABSTRACT

A method and system for controlling when a radio link layer connection to a wireless terminal is released. A packet data serving node (PDSN) may determine what type of communication is being exchanged with a wireless terminal. For example, the PDSN may determine that the type of communication with the wireless terminal is a push-to-talk session, a file transfer protocol session, a web browsing session, or an instant messaging session. Based on the type of communication, the PDSN may signal a base station. In response to the signal, the base station may control when a radio link layer connection to the wireless terminal is released. The base station may set an active-to-dormant timer with a period of time indicative of when the radio link layer connection to the wireless terminal is released.

6 Claims, 6 Drawing Sheets

U.S. PATENT DOCUMENTS

| | | | |
|---|---|---|---|
| 6,871,074 | B2 | 3/2005 | Harris et al. |
| 2002/0055364 | A1 | 5/2002 | Wang et al. |
| 2002/0071445 | A1 | 6/2002 | Wu et al. |
| 2002/0145990 | A1 | 10/2002 | Sayeedi |
| 2002/0147818 | A1 | 10/2002 | Wengrovitz |
| 2002/0172165 | A1 | 11/2002 | Rosen et al. |
| 2002/0172169 | A1 | 11/2002 | Rosen et al. |
| 2002/0172178 | A1 | 11/2002 | Suzuki et al. |
| 2002/0173325 | A1 | 11/2002 | Rosen et al. |
| 2002/0173326 | A1 | 11/2002 | Rosen et al. |
| 2002/0173327 | A1 | 11/2002 | Rosen et al. |
| 2002/0177461 | A1 | 11/2002 | Rosen et al. |
| 2002/0191583 | A1 | 12/2002 | Harris et al. |
| 2003/0008657 | A1 | 1/2003 | Rosen et al. |
| 2003/0021264 | A1 | 1/2003 | Zhakov et al. |
| 2003/0114156 | A1 | 6/2003 | Kinnavy |
| 2003/0189951 | A1 | 10/2003 | Bi et al. |

OTHER PUBLICATIONS

Office Action from Application No. 10/067,080, dated May 21, 2003.
Office Action from Application No. 10/067,080, dated Apr. 27, 2004.
International Search Report from International Application No. PCT/US02/31411, dated Mar. 4, 2003.
International Search Report from International Application No. PCT/US02/29575, dated Dec. 10, 2002.
International Search Report from International Application No. PCT/US02/36055, dated Apr. 10, 2003.
International Search Report from International Application No. PCT/US03/03021, dated Jun. 18, 2003.
International Search Report from International Application No. PCT/US03/02950, dated Nov. 6, 2003.
U.S. Appl. No. 10/277,465, filed Oct. 22, 2002 entitled "Method for Call Setup Using Short Data Bursts".
3$^{rd}$ Generation Partnership Project 2 "3GPP2", Fast Call Set-Up," Version 1.0, Apr. 15, 2002.
Mobile Tornado, http://www.mobiletornado.com/products_iprsptt.html, printed from the World Wide Web on Jan. 27, 2003.
"Qualcomm Chats Up 'Push-to-Talk'," http://siliconvalley.internet.com/news/print.php/953261, printed from the World Wide Web on Jan. 27, 2003.
Schulzrinne and Rosenberg, "SIP Caller Preferences and Callee Capabilities," Internet Engineering Task Force, Internet Draft, Oct. 22, 1999.
Vakil et al., "Host Mobility Management Protocol Extending SIP to 3G-IP Networks," Internet Engineering Task Force, Internet Draft, Oct. 1999.
Campbell and Sparks, "Control of Service Context Using SIP Request—URI," Network Working Group, Apr. 2001.
Ericsson, www.telecomcorridor.com/wireless%20horizons/1Coyne.pdf, printed from the World Wide Web on Jun. 27, 2001.
Dirk Kutscher/Jorg Ott, "The Message Bus—A Communication & Integration Infrastructure for Component-Based Systems," White Paper, Jan. 2000.
Ott et al., "A Message Bus for Local Coordination," Network Working Group, Internet-Draft, May 30, 2001.
TR45, Medium Access Control (MAC) Standard for cdma2000 Spread Spectrum Systesm, IS-2000-3, Jul. 12, 1999.
3$^{rd}$ Generation Partnership Project 2 '3GPP2', "Interoperability Specification (IOS) for CDMA 2000 Access Network Interfaces—Part 3 Features," Nov. 2001.
Perkins, "IP Mobility Support," Internet Engineering Task Force Request for Comment 2002, Oct. 1996.
Perkins, "IP Encapsulation within IP," Internet Engineering Task force Request for Comments 2003, Oct. 1996.
Perkins, "Minimal Encapsulation with in IP," Internet Engineering Task Force Request for Comments 2004, Oct. 1996.
Solomon, "Applicability Statement for IP Mobility Support," Internet Engineering Task Force Request for Comments 2005, Oct. 1996.
Handley et al., "SDP: Session Description Protocol," Internet Engineering Task Force Request for Comment 2327, Apr. 1998.
Handley et al., "SIP: Session Initiation Protocol," Internet Engineering Task Force Request for Comment 2543, Mar. 1999.
Fielding et al., "Hypertext Transfer Protocol—HTTP/1.1," Internet Engineering Task force Request for Comment 2616, Jun. 1999.
Rigney et al., "Remote Authentication Dial in User Service (RADIUS)," Internet Engineering Task Force Request for Comment 2865, Jun. 2000.
Rigney, "RADIUS Accounting," Internet Engineering Task Force Request for Comment 2866, Jun. 2000.
OMA, Discussion and definitions on PoC Floor Control, Input Contribution, Doc #OMA-REQ-2003-0375-PoC_Floor_Control, Jun. 2, 2003.
OMA, "PoC Use case: Mobile—PC Example," Input Contibution, Doc #OMA-REQ-2003-0323 PoC Mobile-PC use case, May 5, 2003.
OMA, "PoC Use case: Multimedia Group Call Example," Input Contribution, Doc #OMA-REQ-2003-0306-PoC UseCase-group-multimedia-scenario, May 6, 2003.
OMA, "PoC Use case: Examples of User Requirements," Input Contribution, Doc #OMA-REQ-2003-0305-PoC Use Case, May 6, 2003.
OMA, "Inputs for PoC Requirements Document," Input Contribution, Doc #OMA-REQ-2003-0367-PoC_Input_Motorola, May 29, 2003.
OMA, "Push to Talk over Cellular (PoC)," Version: 0.1.6, May 12, 2003.

* cited by examiner

| TYPE OF COMMUNICATION | ACTIVE - TO - DORMANT TIMER SETTINGS |
|---|---|
| PTT | 10 |
| INSTANT MESSAGE | 14 |
| FTP | 3 |

FIG. 6

METHOD AND SYSTEM FOR CONTROLLING WHEN A RADIO LINK LAYER CONNECTION TO A WIRELESS TERMINAL IS RELEASED

BACKGROUND

1. Field of Invention

This invention relates to wireless communication and more particularly to a method and system for controlling when a radio link layer connection to a wireless terminal is released.

2. Description of Related Art

A wireless terminal is a form of telecommunication technology that enables people to communicate with others. The wireless terminal can take a variety of forms. The wireless terminal may be, for example, a cellular phone, a pager, a personal digital assistant (PDA), a portable computer with wireless modem, or a fixed wireless device.

The wireless terminal exchanges signals with a radio access network. The radio access network communicatively couples the wireless terminal to a remote terminal. The remote terminal may be, for example, another cellular telephone, a pager, a PDA, a portable computer with wireless modem, or a fixed wireless device.

The radio access network typically has a base transceiver station (BTS) and a base station controller (BSC) (collectively referred to as a "base station"). The wireless terminal exchanges signals with the BTS. In turn, the BTS exchanges the signals with the BSC. The BSC may be coupled to a mobile switching center (MSC) and a packet data serving node (PDSN). The MSC may facilitate communication with a public switched telephone network (PSTN) and the PDSN may facilitate communication with an IP network.

A properly equipped wireless terminal can initiate packet-data communications by sending an initiation request message to the MSC, via the BTS and the BSC. Applying industry standards, the initiation request message may include a "packet data" service option code that characterizes requested communication as packet-data communication, as compared to voice communication. The MSC may detect the packet data service option code when the MSC receives the initiation request and responsively send the message back to the BSC for handling.

In turn, when the BSC receives the initiation request from the MSC, the BSC may establish a radio link layer connection to the wireless terminal. In addition, the BSC may pass the initiation request to the PSDN. The PDSN and the wireless terminal may then negotiate with each other to establish a data link layer connection, typically a point-to-point protocol (PPP) session, to exchange packet data.

In most wireless communication systems, the radio access network may have an active-to-dormant timer. The active-to-dormant timer is set with a period of time indicative of when a radio link layer connection to the wireless terminal is released. The active-to-dormant timer starts when there is there is no activity over the radio link layer connection and stops when there is activity over the radio link layer connection. If the active-to-dormant timer expires, i.e., runs continuously for the period of time, then there is no activity over the radio link layer connection for the period of time. Responsively, the BSC may release the radio link layer connection to the wireless terminal.

The data-link layer (e.g., PPP) connection with the wireless terminal might remain, even though the radio link layer connection to the wireless terminal is released. Thus, the wireless terminal may still seek to send packet data to other entities, and other entities may still seek to send packet data to the wireless terminal. The BSC will page the wireless terminal over an air interface paging channel when another entity seeks to send packet data to the wireless terminal. When the wireless terminal receives a page indicative of an incoming data communication, or if the wireless terminal seeks to send data, the radio link layer connection with the wireless terminal will need to be re-established. To do so, the wireless terminal may send a message to the BSC to request radio link layer resources and the BSC may then establish a radio link layer connection to the wireless terminal. The wireless terminal may then send or receive packet data over the radio link layer connection.

SUMMARY

The BSC typically sets the active-to-dormant timer with a period of time indicative of when a radio link layer connection to the wireless terminal is released. The period of time is generally long enough so that delays between request/response communications do not result in the active-to-dormant timer expiring and the radio link layer connection being released before the communications are complete. On the other hand, the period of time is generally not so long as to cause the active-to-dormant timer not to expire and the radio link layer connection not to be released.

In some instances, however, the period of time to which the BSC sets the active-to-dormant timer causes the radio link-layer connection to be held open long after the communication is complete. In other instances, the period of time to which the BSC sets the active-to-dormant timer causes the radio link layer connection to be released before the communication is complete. Therefore, there exists a need for a method and system for reliability establishing when a radio link layer connection is released so that there is efficient use of radio link layer resources.

In accordance with an exemplary embodiment of the present invention, the PDSN may detect what type of communication is being exchanged with the wireless terminal. The type of communication may be, for example, a push-to-talk session (PTT), a file transfer protocol (FTP) session, an instant messaging session, or a web browsing session with the wireless terminal. Based on the type of communication being exchanged with the wireless terminal, the PDSN may signal the base station. The signal may cause the base station to control, based on the type of communication, when a radio link layer connection to the wireless terminal is released.

An active-to-dormant timer may be associated with the radio link layer connection to the wireless terminal. The active-to-dormant timer may be set with the period of time indicative of when the radio link layer connection is released for the type of communication. By setting the active-to-dormant timer in accordance with the type of communication, there is less of a chance that a radio link-layer connection will be released before the communication is complete. Additionally or alternatively, there is less of a chance that the radio link-layer connection will be held open long after the communication is complete.

These as well as other aspects and advantages will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
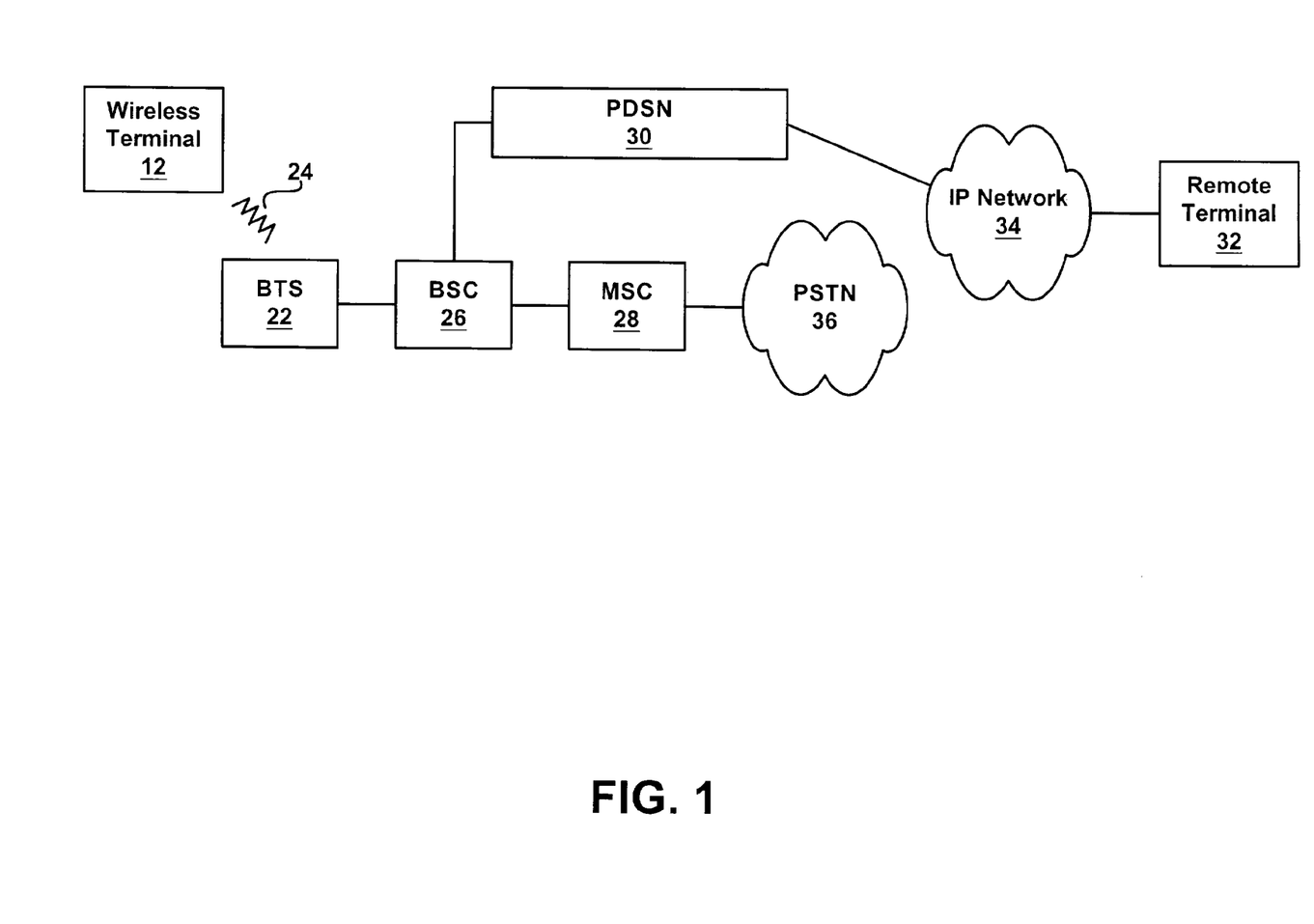
FIG. 1 is a block diagram of a wireless network.

FIG. 1 is a block diagram of a wireless network in which exemplary embodiments of the present invention may be employed. It should be understood that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location. Still further, the various functions described herein may be carried out by logic defined by hardware or by computer instructions, e.g., software or firmware, stored in memory and executable by a processor. Provided with the present disclosure, those skilled in the art can readily design the hardware or prepare the computer instructions necessary to perform the various functions.

The wireless network may include a wireless terminal 12. The wireless terminal 12 may be a cellular phone, a pager, a personal digital assistant (PDA), a portable computer with wireless modem, or a fixed wireless device. Indeed, the wireless terminal 12 could take a variety of forms now known or later developed.

Additionally, the wireless network may include a radio access network. The radio access network may facilitate exchange of signals between the wireless terminal 12 and a remote terminal 32. By way of example, the radio access network may include a BTS 22 that can communicate with the wireless terminal 12 over an air interface 24. The BTS 22 may be coupled to BSC 26. The BTS 22 and BSC 26 combination may be collectively referred to as a "base station" or serving node. The base station may produce a radiation pattern that defines a coverage area of the radio access network. Additionally, the radiation pattern may facilitate exchange of signals with the wireless terminal 12 over the air interface 24.

The BSC 26 may be coupled to an MSC 28 and a PDSN 30. The MSC 28 may facilitate communication with a PSTN 36. On the other hand, the PDSN 30 may serve as a gateway to an IP network 34. The PDSN 30 may facilitate exchange of packet data with the IP network 34.

Figure 2:
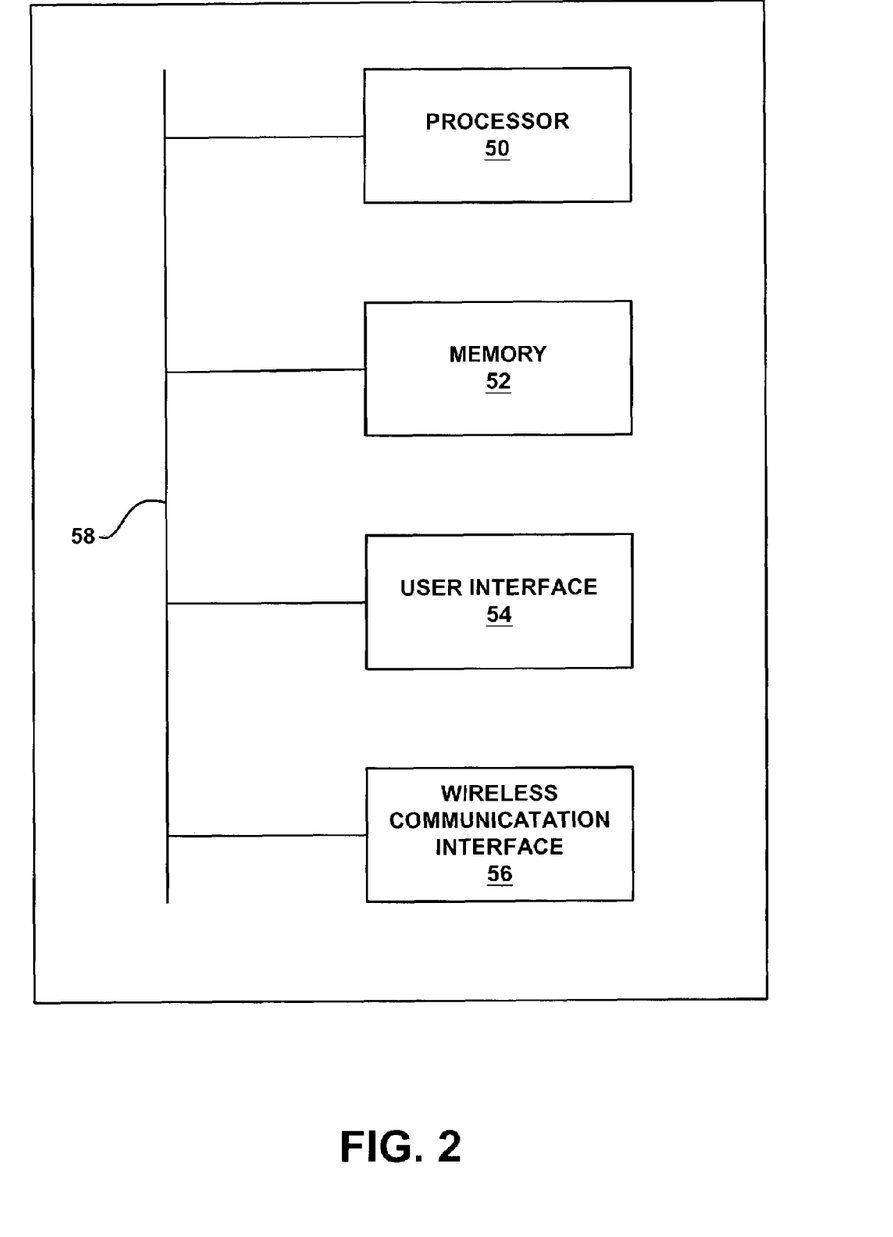
FIG. 2 is a block diagram of an exemplary wireless terminal.

FIG. 2 is a block diagram of an exemplary wireless terminal 12. As shown in FIG. 2, the exemplary wireless terminal 12 may include a processor 50, memory 52, a user interface 54, and a wireless communication interface 56, coupled together by a bus 58.

Each of these components may take various forms, the particular details of which are not necessarily critical to the exemplary embodiments of the present invention. For instance, the processor 50 may be a general purpose processor or a digital signal processor. In addition, the memory 52 may be random access memory (RAM), read only memory (ROM), flash memory and/or a storage drive. The memory 52 may hold a set of logic (e.g., computer instructions) executable by processor 50 to establish a radio link layer connection with the BTS 22 when the wireless terminal 12 is powered on, in response to a user request, or in response to another triggering event. Alternatively, the logic may be embodied in hardware, rather than, or in addition to, embodied in the computer instructions.

User interface 54 may facilitate voice and data interactions with the wireless terminal 12. The user interface 54 might include a microphone for receiving analog speech signals from a user and a speaker for playing out analog speech signals. Further, the wireless terminal 12 will likely include digital/analog conversion circuitry for converting between analog media signals and digital representations of those signals. The user interface 54 may also include a display for presenting information and menus to a user, e.g., web content, as well as one or more input mechanisms (e.g., keyboard, keypad, mouse, and/or touch-sensitive display) for accepting user-input.

Wireless communication interface 56 may facilitate communication over the air interface 28 with the base station. The wireless communication interface 56 may define, for instance, an antenna, an infrared port, or some other apparatus for facilitating communication over the air interface 24.

Figure 3:
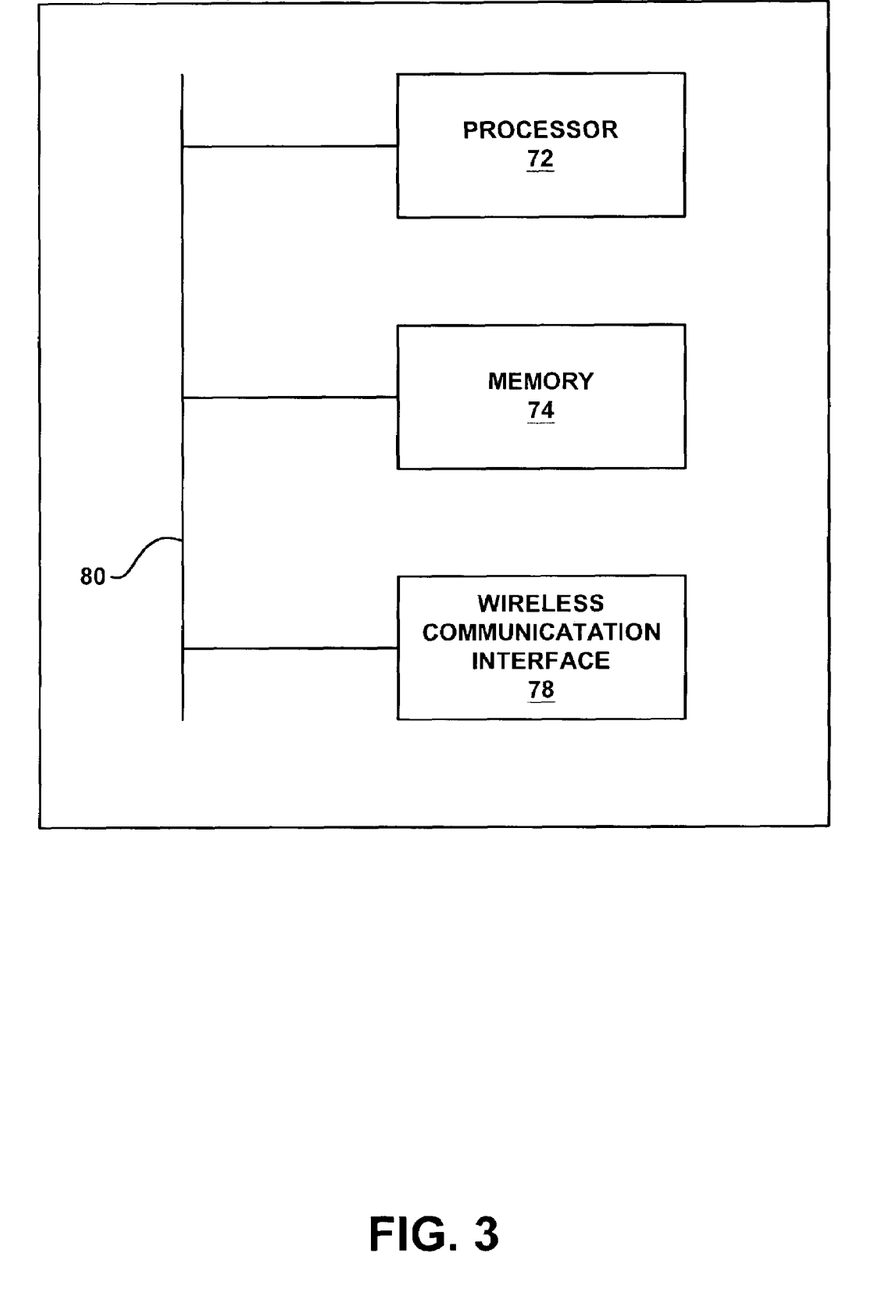
FIG. 3 is a block diagram of an exemplary base station.

FIG. 3 is a block diagram of an exemplary base station. The base station may have a processor 72, memory 74, and a wireless communication interface 78, coupled to a bus 80. Computer instructions stored in the memory and executable by the processor may facilitate exchange of signals with the wireless terminal 12. For example, the base station may assign a traffic channel to the wireless terminal 12 to define a radio link layer connection to the wireless terminal 12. The wireless communication interface 78 may facilitate communication over the air interface 24. The wireless communication interface 78 may be an antenna, an infrared port, or some other apparatus for facilitating communication over the air interface 24.

The base station may also have computer instructions stored in the memory 74 and executable by the processor 72 that defines at least one active-to-dormant timer. The active-to-dormant timer may control when a radio link layer connection to the wireless terminal 12 is released. The active-to-dormant timer may be set with a period of time indicative of when a radio link layer connection to the wireless terminal 12 is released. The active-to-dormant timer may be started when there is no activity over the radio link layer connection (i.e., radio link layer connection is inactive) and stopped when there is activity over the radio link layer connection. If the active-to-dormant timer expires, i.e., runs continuously for the period of time, then there is no activity over the radio link layer connection for the period of time. Responsively, the BSC 26 may release the radio link layer connection to the wireless terminal 12 so that the traffic channel assigned to the radio link layer connection is not tied up.

Activity over the radio link layer connection may be characterized by session initiation protocol (SIP) messages, hyper-text transfer protocol (HTTP) communication, real-time transport protocol (RTP) packets, or some other form of user-generated communication conveyed over the radio link layer connection to the wireless terminal 12. If there is no such communication over the radio link layer connection for the period of time, then the active-to-dormant timer 76 may expire. The base station may, in turn, release the traffic channel assigned to the wireless terminal 12. By releasing the traffic channel, the radio link layer connection to the wireless terminal 12 may also be released. The wireless terminal might not be able to send or receive SIP messages, HTTP communication, or RTP packets over a radio link layer connection to the wireless terminal 12 until the mobile station 12 requests and the base station assigns another traffic channel to the wireless terminal 12.

Figure 4:
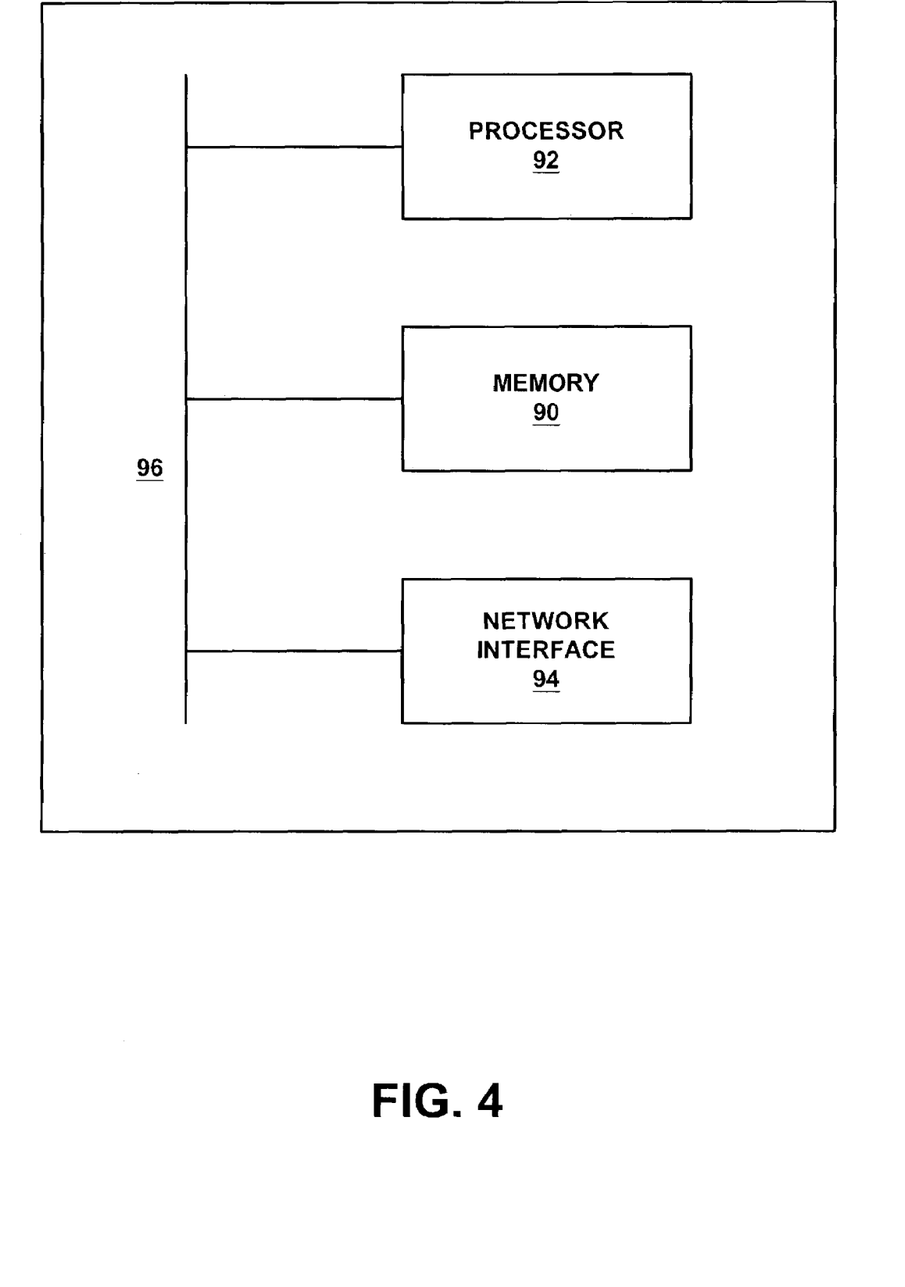
FIG. 4 is a block diagram of an exemplary packet data serving node.

FIG. 4 is a block diagram of an exemplary PDSN. The PDSN may have a processor 92 and memory 90 coupled to a bus 96. The memory 90 may store computer instructions executable by the processor 92 for routing packets between the radio access network and the IP network. The PDSN may take the form of a layer 4-7 router such as 3Com Corporation's Edge Server or Nortel's Shasta Server. The layer 4-7 router allows for accessing contents of the packet exchanged between the IP network 34 and the radio access network. The header or payload may have a code that indicates that the packet is a SIP message or an RTP packet associated with an instant messaging session, push-to-talk session (PTT), file transfer protocol (FTP) session, etc. Alternatively, the header or payload may have a code that indicates that the packet is HTTP communication associated with a web browsing session. The PDSN 30 may read the code in the header or payload of a packet and determine the type of communication. Other arrangements are also possible.

FIG. 4 illustrates that the PDSN 30 may have a network interface 94 also coupled to the bus 96. The network interface 94 may facilitate exchange of the packets between the radio access network and the IP network 36. The network interface 94 may also facilitate communication of management and control information with the base station. The network interface 94 may define a radio-packet (R-P) interface that allows for the PDSN 30 to communicate the management and control information with the base station, but of course other arrangements are also possible.

In accordance with an exemplary embodiment of the present invention, the PDSN 30 may detect what type of communication is being exchanged with the wireless terminal 12. Based on the type of communication, the PDSN 30 may signal the base station. The signal may cause the base station to control when a radio link layer connection to the wireless terminal 12 is released. For example, the base station may set an active-to-dormant timer with a period of time. The period of time may be indicative of when a radio link layer connection to a wireless terminal 12 is released for the type of communication. When the active-to-dormant timer expires, i.e., there is no activity over the radio link layer connection for the period of time, the base station may release the radio link layer connection to the wireless terminal 12.

Figure 5:
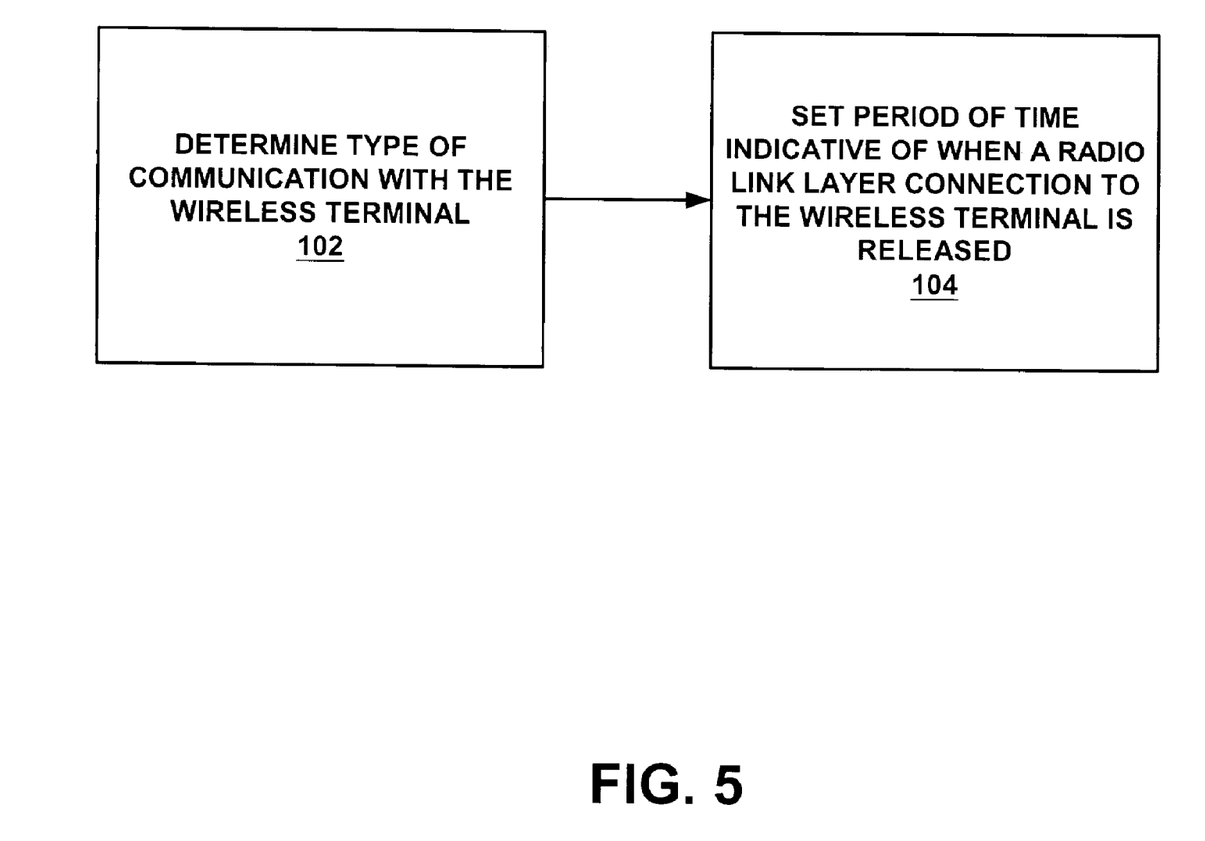
FIG. 5 is a flow chart depicting processing to control when a radio link layer connection with a wireless terminal is released.

FIG. 5 is a flow chart depicting processing to control when a radio link layer connection with a wireless terminal is released, in accordance with the exemplary embodiment of the present invention.

At step 102, the PDSN 30 may determine what type of communication being exchanged with the wireless terminal 12. The communication with the wireless terminal 12 may be packets that define SIP messages, HTTP request/response communication, or RTP packets. A code in the header or payload of the packet may define what type of communication is being exchanged with the wireless terminal 12. The PDSN 30 may read the code in the header or the payload of the packet to determine what type of communication is being exchanged with the wireless terminal 12.

For example, the header of the packet may have a code that indicates that the packet is a SIP message associated with an instant messaging session or FTP session, an HTTP communication, e.g., HTTP request/response, associated with web browsing session, or an RTP packet associated with a PTT session. Alternatively, the payload of the packet may have a code that indicates that it carries RTP packets associated with a PTT session. Other arrangements are also possible.

The type of communication with the wireless terminal 12 may provide an indication as to utilization of the radio link layer connection to the wireless terminal 12. An FTP session is typically defined by a continuous stream of packets, with little time-gaps between packets. On the other hand, in an instant messaging session, web browsing, or PTT session, there may be large time-gaps between packets. The large time-gaps are due to delay in parties typing in an instant message or responding during the PTT session or the web browsing session. The time-gaps may be longer than the time-gaps during an FTP download session.

The PDSN 30 may send a signal to the BSC 26. For example, the PDSN 30 may send the signal over the R-P interface to the BSC 26. The signal may be indicative of the type of communication with the wireless terminal 12.

At step 104, the signal may cause the BSC 26 to set a period of time indicative of when the radio link layer connection to the wireless terminal is released for the type of communication. For instance, the base station may set the active-to-dormant timer with the period of time indicative of when the radio link layer connection is released. As a result, the BSC may be able to control, based on the type of communication, when a radio link layer connection to the wireless terminal 12 is released.

The period of time set by the BSC 26 may be chosen in accordance with the type of communication. For example, the BSC 26 may set the period of time for the active-to-dormant timer to be longer for a PTT, instant messaging, or web browsing session as compared to an FTP session. The period of time for the active-to-dormant timer may be longer for the PTT, instant messaging, or web browsing session as compared to the FTP session because there may be longer time gaps between packets during the PTT, instant messaging, or web browsing session as compared to the FTP session. By setting the period of time for the active-to-dormant timer in accordance with the type of communication, the active-to-dormant timer may account for the time-gaps between packets in the type of communication, so that the active-to-dormant timer does not expire before the communication is complete. Also, the radio link layer connection might not be held open long after the communication is complete.

Figure 6:
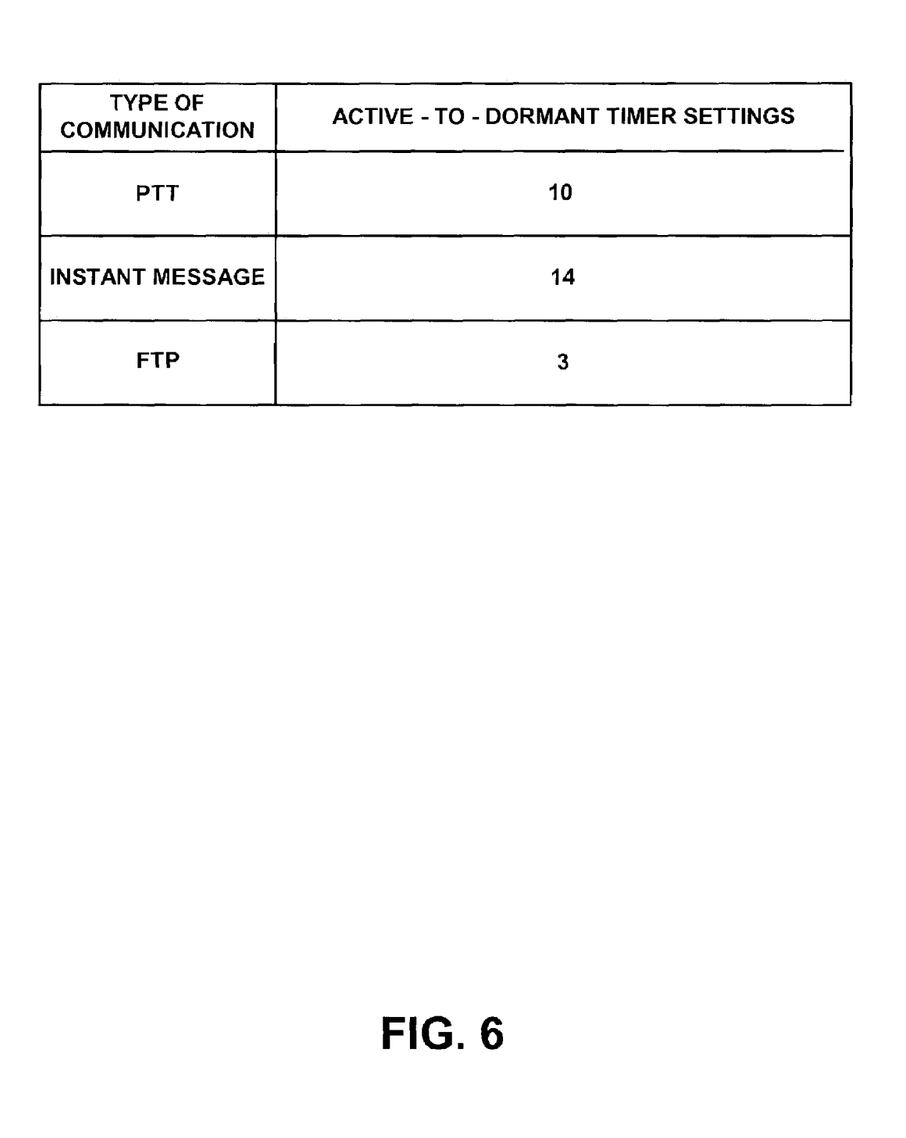
FIG. 6 is a table that describes exemplary periods of time to which an active-to-dormant timer may be set for various types of communication.

The PDSN 30 and/or base station may have stored in memory a table that defines, for various types of communication, periods of time to which the active-to-dormant timer should be set. The periods of time may be indicative of when the active-to-dormant timer expires. Also, the periods of time may be indicative of when the radio link layer connection to the wireless terminal 12 is released.

FIG. 6 illustrates an exemplary table. The PDSN 30 and/or base station may access the table to determine the period of time to which the active-to-dormant timer should be set when the communication with the wireless terminal 12 is of a certain type. The periods of time defined by the table for different communication types are merely exemplary in nature. Additionally, the table may define periods of time for other types of communications, e.g., web browsing sessions.

According to one exemplary embodiment, the PDSN 30 may determine the type of communication with the wireless terminal 12. In turn, the PDSN 30 may send to the BSC 26, a signal indicative of the type of communication with the wireless terminal. The BSC 26, in turn, may receive a signal indicative of the type of communication and access the table to determine, for the type of communication, the period of time for the active-to-dormant timer. The active-to-dormant timer may be set to, for example, 10 seconds, 14 seconds, or 3 seconds depending on whether the type of communication with the wireless terminal 12 is a PTT session, instant messaging session, or FTP session, respectively.

According to another exemplary embodiment, the PDSN 30 may determine the type of communication with the wireless terminal. The PDSN 30 may access the table to determine, for the type of communication, the period of time for the active-to-dormant timer. The PDSN 30 may then send a signal to the BSC 26 indicative of the period of time. The BSC 26, in turn, may receive signal and set the active-to-dormant timer with the period of time indicated by the signal. The active-to-dormant timer may be set to, for example, 10 seconds, 14 seconds, or 3 seconds depending on whether the type of communication with the wireless terminal 12 is a PTT session, instant messaging session, or FTP session, respectively. When the active-to-dormant timer expires, i.e., there is no activity over the radio link layer connection for the period of time, the base station may release the radio link layer connection to the wireless terminal 12.

The exemplary embodiments described above involve setting the active-to-dormant timer with the period of time indicative of when a radio link layer connection is released. Rather than an active-to-dormant timer, the base station may have some other mechanism for controlling when a radio link layer connection is released. The other mechanism may be embodied in software or hardware. The base station may set the other mechanism with the period of time indicative of when the radio link layer connection is released. The exemplary embodiments of the present invention should not be limited by how the base station controls when a radio link layer connection is released.

Examples of Controlling when a Radio Link Layer Connection to a Wireless Terminal is Released The following are two examples in which a base station may control when a radio link layer connection is released, in accordance with the exemplary embodiments of the present invention.

The PDSN may receive a packet. The PDSN may examine the header of the packet and determine from a code, for instance, that the packet is a SIP message associated with an instant messaging session. The instant messaging session is inherently bursty. There may be large time-gaps between packets. The PDSN may signal the BSC over the R-P interface with the type of communication. Responsively, the base station may access the table of FIG. 6, for instance, and determine, for the type of communication, that the active-to-dormant timer should be set to e.g., 14 seconds. If the radio link layer connection is inactive for 14 seconds, then the active-to-dormant timer will expire and the base station may release the radio link layer connection to the wireless terminal.

In another example, the PDSN may also receive a packet. The PDSN may, again, examine the header of the packet and determine from a code, for instance, that the packet is an RTP packet associated with a FTP session. The PDSN may access the table of FIG. 6, for instance, and determine that the active-to-dormant timer should be set to e.g., 2 seconds. The PDSN may signal the base station to set the active-to-dormant timer to 2 seconds. The base station may receive the signal from the base station and responsively set the active-to-dormant timer to 2 seconds. If the radio link layer connection is inactive for 2 seconds, then the active-to-dormant timer will expire and the base station may release the radio link layer connection to the wireless terminal.

Exemplary embodiments of the present invention have been described above. Those skilled in the art will understand, however, that changes and modifications may be made to these embodiments without departing from the true scope and spirit of the invention, which is defined by the claims.

What is claimed is:

1. A system comprising:
a packet data serving node;
a base station;
a communication path communicatively coupling the packet data serving node and the base station; and
a wireless terminal;
wherein the packet data serving node facilitates communication between the base station and a packet switch network and has logic for (i) determining what type of communication is being exchanged with the wireless terminal and (ii) responsively sending to the base station over the communication path, a signal indicative of the type of communication,
wherein the base station has logic for (i) receiving the signal indicative of the type of communication; and (ii) controlling, based on the signal indicative of the type of communication, when a radio link layer connection to the wireless terminal is released,
wherein the packet data serving node is communicatively coupled to a radio-packet interface, the radio packet interface enabling the packet data serving node to send to the base station, over the communication path, the signal indicative of the type of communication, and
wherein the type of communication is selected from the group consisting of an instant messaging session, a file-transfer-protocol session, a push-to-talk session, and an HTTP communication.

2. The system of claim 1, wherein the logic for controlling when the radio link layer connection to the wireless terminal is released comprises logic for setting a period of time indicative of when the radio link layer connection to the wireless terminal is released.

3. The system of claim 2, wherein the packet data serving node comprises a table that defines, for the type of communication, the period of time indicative of when the radio link layer connection to the wireless terminal is released.

4. The system of claim 2, wherein the base station comprises a table that defines, for the type of communication, the period of time indicative of when the radio link layer connection to the wireless terminal is released.

5. The system of claim 2, wherein the base station comprises an active-to-dormant timer;
wherein the logic for setting the period of time indicative of when the radio link layer connection to the wireless terminal is released comprises logic for setting the active-to-dormant timer with the period of time; and
wherein the logic for controlling when the radio link layer connection to the wireless terminal is released comprises:
starting the active-to-dormant timer;
determining that the active-to-dormant timer has run continuously for the period of time; and
responsively releasing the radio link layer connection to the wireless terminal.

6. The system of claim 1, wherein the logic for controlling, based on the signal indicative of the type of communication, when the radio link layer connection to the wireless terminal is released comprises logic for:
determining that, for a period of time, the radio link layer connection to the wireless terminal is inactive; and
responsively releasing the radio link layer connection to the wireless terminal.

* * * * *